US012702096B2

(12) United States Patent
Schultz et al.

(10) Patent No.: US 12,702,096 B2
(45) Date of Patent: Aug. 11, 2026

(54) LANDSCAPE EDGING SYSTEM

(71) Applicant: LTR Products, LLC, Pittsburgh, PA (US)

(72) Inventors: Todd Schultz, O'Fallon, MO (US); Robert Payne, Ballwin, MO (US)

(73) Assignee: LTR Products, LLC, Pittsburgh, PA (US)

( * ) Notice: Subject to any disclaimer, the term of this patent is extended or adjusted under 35 U.S.C. 154(b) by 325 days.

(21) Appl. No.: 18/501,785

(22) Filed: Nov. 3, 2023

(65) Prior Publication Data

US 2025/0143231 A1 May 8, 2025

(51) Int. Cl.
*A01G 9/28* (2018.01)
*F16B 5/00* (2006.01)

(52) U.S. Cl.
CPC .............. *A01G 9/28* (2018.02); *F16B 5/0084* (2013.01)

(58) Field of Classification Search
CPC ....... A01G 9/28; F16B 5/0084; E01C 11/221; E04H 17/1452; E04H 17/009; E04H 17/22
USPC ............................... 47/33; 404/7, 13; 52/102
See application file for complete search history.

(56) References Cited

U.S. PATENT DOCUMENTS 425,890 A * 4/1890 Landis .................... A01G 9/28 47/33
652,050 A * 6/1900 Stierlin ................... A01G 9/28 47/33
1,066,416 A * 7/1913 Noll ........................ A01G 9/28 52/102
1,657,012 A * 1/1928 Keddy ..................... A01G 9/28 404/7
1,813,055 A * 7/1931 Kannen .................... A01G 9/28 47/33
3,002,493 A * 10/1961 Galamba ................ E04H 17/22 256/25
3,762,113 A * 10/1973 O'Mullan ............ E01C 11/222 47/33
3,797,049 A * 3/1974 De Santo ............. E04H 4/0018 62/235
4,197,684 A * 4/1980 Johnson .................. A01G 9/28 47/33
(Continued)

FOREIGN PATENT DOCUMENTS

DE 102005005240 A1 8/2006
GB 504333 A 4/1939
JP 2001231362 A 8/2001

*Primary Examiner* — Amber R Anderson
(74) *Attorney, Agent, or Firm* — Stinson LLP

(57) ABSTRACT

A landscape edging system forms landscape edging by connecting landscape edging units end-to-end and securing them to ground. The landscape edging system includes landscape edging units, a landscape edging end connector, and landscape spikes. The end connector has first and second legs that define lower spike receivers. The first and second landscape edging units define fitting recesses below upper spike receivers. The legs of the end connector are press-fit into the fitting recesses of adjacent landscape edging units to establish mortise-and-tenon connections between the end connector and the landscape edging units. This aligns the upper and lower spike receivers so that first and second landscape spikes can be driven through a first pair of aligned upper and lower spike receivers and a second pair of aligned upper and lower spike receivers, respectively, into the ground.

15 Claims, 10 Drawing Sheets

(56) References Cited

U.S. PATENT DOCUMENTS

| | | | | |
|---|---|---|---|---|
| 4,498,803 | A * | 2/1985 | Quittner | E01F 15/006 404/6 |
| 4,831,776 | A * | 5/1989 | Fritch | A01G 9/28 47/33 |
| 4,967,522 | A * | 11/1990 | Keen | A01G 9/28 47/33 |
| D315,026 | S | 2/1991 | Castonguay et al. | |
| 5,283,994 | A * | 2/1994 | Callison | E02D 29/0266 47/33 |
| 5,377,447 | A * | 1/1995 | Fritch | A01G 9/28 47/33 |
| 5,442,877 | A * | 8/1995 | Lindhal | A01G 9/28 47/33 |
| 5,456,555 | A * | 10/1995 | Bokeler | E02D 29/025 52/562 |
| 5,826,372 | A * | 10/1998 | Parsons | A01G 9/28 47/33 |
| 5,862,629 | A * | 1/1999 | Sulyman | A01G 9/28 47/33 |
| 5,882,140 | A * | 3/1999 | Yodock, Jr. | E01F 15/083 404/6 |
| 5,921,021 | A * | 7/1999 | Coates | A01G 9/28 47/33 |
| 5,993,103 | A * | 11/1999 | Christensen | E01F 9/70 116/63 P |
| 6,086,285 | A * | 7/2000 | Christensen | E01F 9/70 404/6 |
| 6,102,374 | A * | 8/2000 | Macri | A01G 9/28 47/33 |
| 6,389,742 | B1 * | 5/2002 | Wuster | E01C 11/222 47/33 |
| 6,418,675 | B1 * | 7/2002 | Peggs | E04H 17/1404 47/33 |
| 6,460,298 | B1 * | 10/2002 | Elias | A01G 9/28 47/33 |
| 6,588,979 | B1 * | 7/2003 | Pasij | E02B 3/106 405/15 |
| 7,275,888 | B1 * | 10/2007 | Christensen | E01F 15/086 404/6 |
| 7,997,823 | B2 * | 8/2011 | Meyers | E01F 15/003 404/9 |
| D716,969 | S | 11/2014 | Erdman et al. | |
| 9,974,240 | B1 | 5/2018 | Brinner et al. | |
| 10,774,489 | B1 * | 9/2020 | Yodock, Jr | E02B 3/108 |
| 2002/0141819 | A1 * | 10/2002 | Jones | A01G 9/28 404/7 |
| 2004/0020113 | A1 * | 2/2004 | Zwier | A01G 9/28 47/33 |
| 2004/0237391 | A1 * | 12/2004 | English | A01G 9/28 47/33 |
| 2005/0193647 | A1 * | 9/2005 | Jones | A01G 9/28 52/169.1 |
| 2006/0096169 | A1 * | 5/2006 | Love | A01G 9/28 47/10 |
| 2008/0163566 | A1 * | 7/2008 | Bella | E01C 11/221 47/33 |
| 2010/0186293 | A1 * | 7/2010 | Flynn | A01G 9/28 47/33 |
| 2013/0025195 | A1 * | 1/2013 | Wuster | A01G 9/28 47/33 |
| 2014/0191172 | A1 * | 7/2014 | Christoffer | E04G 21/3223 256/21 |
| 2019/0010970 | A1 * | 1/2019 | Morimoto | A47B 87/001 |
| 2019/0133053 | A1 * | 5/2019 | Dervin-Stathes | F16C 11/12 |
| 2019/0226232 | A1 * | 7/2019 | Goodin | E04H 12/2276 |
| 2021/0112731 | A1 * | 4/2021 | Fischer | A01G 9/28 |
| 2022/0064985 | A1 * | 3/2022 | Muc | E04H 17/18 |

* cited by examiner

W1
24
12
L1
46
44
44
24

LANDSCAPE EDGING SYSTEM

FIELD

The present disclosure generally relates to a landscape edging system. More particularly, the disclosure relates to a landscape edging system for connecting landscape edging and installing the landscape edging on ground.

BACKGROUND

Landscape edging is commonly used in landscaping to create borders between different areas of the landscape. Landscape edging can include landscape edging units that are placed end-to-end along the landscape border. Landscape edging units are formed from a wide variety of materials such as plastic, stone, concrete, and recycled tire rubber.

SUMMARY

In one aspect, a landscape edging end connector for removably connecting a first landscape edging unit to a second landscape edging unit comprises a fitting body. Each of the first and second landscape edging units have an edging unit end portion defining a fitting recess and an upper spike receiver aligned with the fitting recess. The first and second landscape edging units are configured to be installed on ground as landscape edging such that the edging unit end portion of the first landscape edging unit is end-to-end with the edging unit end portion of the second landscape edging unit. The fitting body has a first fitting end portion and a second fitting end portion spaced apart along a lengthwise direction of the landscape edging. The first fitting end portion defines a first lower spike receiver and the second fitting end portion defines a second lower spike receiver. The first fitting end portion is configured to be fitted into the fitting recess of the edging unit end portion of the first landscape edging unit such that the first lower spike receiver aligns with the upper spike receiver of the first landscape edging unit. The first lower spike receiver is configured to accept a first landscape spike driven through the upper spike receiver of the first landscape edging unit into the ground. The second fitting end portion is configured to be fitted into the fitting recess of the edging unit end portion of the second landscape edging unit such that the second lower spike receiver aligns with the upper spike receiver of the second landscape edging unit. The second lower spike receiver is configured to accept a second landscape spike driven through the upper spike receiver of the second landscape edging unit into the ground.

In another aspect, a landscape edging end connector for removably connecting a first landscape edging unit to a second landscape edging unit comprises a fitting body. The first and second landscape edging units are configured to be installed on ground as landscape edging such that an edging unit end portion of the first landscape edging unit is end-to-end with an edging unit end portion of the second landscape edging unit. The fitting body has a first fitting end portion and a second fitting end portion configured to be spaced apart along a lengthwise direction of the landscape edging. The first fitting end portion is configured to accept a first landscape spike driven into the ground to make a first fitting-body-to-ground connection. Independently of the first fitting-body-to-ground connection, the first fitting end portion is configured to couple to the first landscape edging unit by friction-fit to make a first fitting-body-to-edging-unit connection. The second fitting end portion is configured to accept a second landscape spike driven into the ground to make a second fitting-body-to-ground connection. Independently of the second fitting-body-to-ground connection. The second fitting end portion is configured to couple to the second landscape edging unit by friction-fit to make a second fitting-body-to-edging-unit connection.

In another aspect, a landscape edging system for removably installing a landscape edging unit on ground as landscape edging comprises a first landscape edging unit. The first landscape edging unit has an edging unit end portion defining a fitting recess and an upper spike receiver aligned with the fitting recess. A landscape edging end connector comprises a fitting body with a first fitting end portion and a second fitting end portion configured to be spaced apart along a lengthwise direction of the landscape edging. The first fitting end portion defines a first lower spike receiver. The second fitting end portion defines a second lower spike receiver. The first fitting end portion is configured to be fitted into the fitting recess of the edging unit end portion of the first landscape edging unit such that the first lower spike receiver aligns with the upper spike receiver of the first landscape edging unit. A first landscape spike is configured to be driven through the upper spike receiver of the first landscape edging unit and through the first lower spike receiver of the landscape edging end connector into the ground.

In another aspect, a method of installing landscape edging on ground comprises fitting a first fitting end portion of a landscape edging end connector into a fitting recess of a first landscape edging unit. A second fitting end portion of the landscape edging end connector is fit into a fitting recess of a second landscape edging unit. A first landscape spike is installed through the first landscape edging unit and the first fitting end portion of the landscape edging end connector into the ground. A second landscape spike is installed through the second landscape edging unit and the second fitting end portion of the landscape edging end connector into the ground.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

The disclosure generally pertains to a landscape edging system that can be used to form landscape edging by connecting a set of landscape edging units end-to-end and securing them to the ground. The components of the landscape edging system can be formed using durable, lightweight and cost-effective materials that are easily configured to achieve a desired landscaping aesthetic. As explained in further detail below, the landscape edging system of the present disclosure provides a solution for easily and securely connecting landscape edging units end-to-end and staking the landscape edging to the ground.

Figure 1:
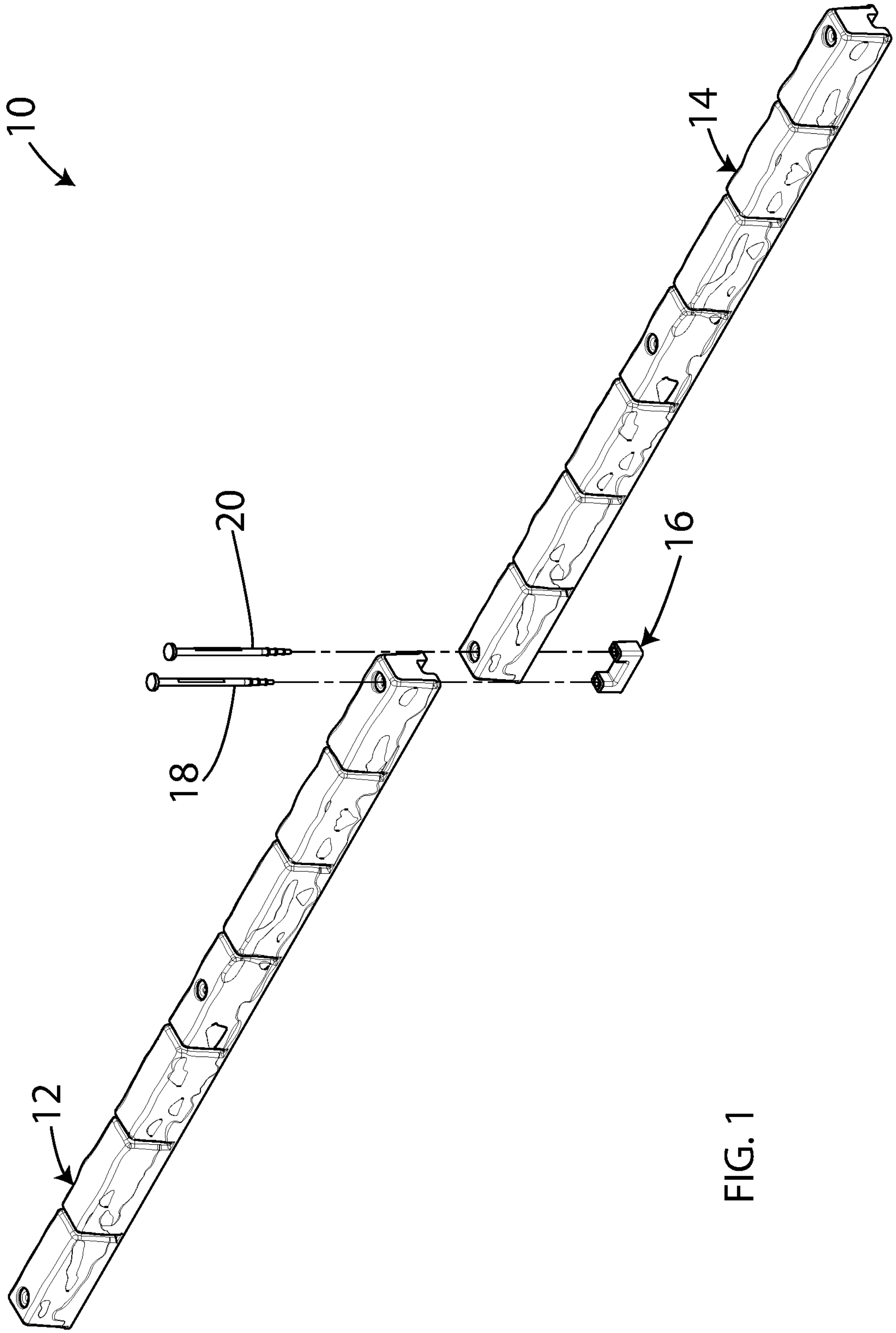
FIG. 1 is an exploded perspective of a landscape edging system.
Figure 2:
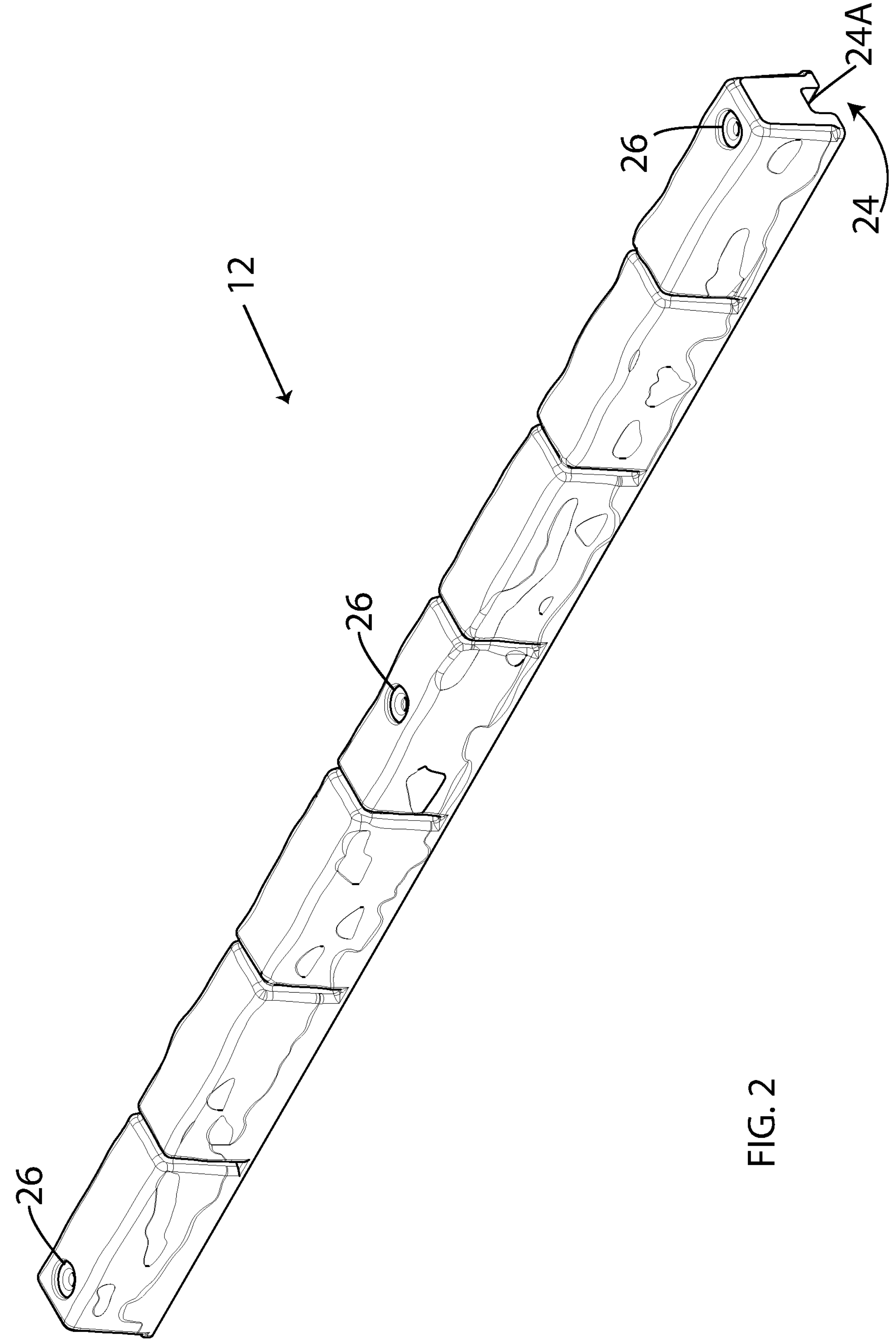
FIG. 2 is a perspective of a landscape edging unit of the landscape edging system.

Referring to FIG. 1, an exemplary embodiment of a landscape edging system in accordance with the present disclosure is generally indicated at reference number 10. The landscape edging system 10 includes a first landscape edging unit 12, a second landscape edging unit 14, a landscape edging end connector 16, a first landscape spike 18 and a second landscape spike 20. The components shown in FIG. 1 are used to make an end-to-end connection of the first landscape edging unit 12 to the second landscape edging unit, but it will be understood that the landscape edging system can include additional components (e.g., additional landscape spikes, end connectors, and/or edging units not shown). As explained more fully below, the end connector 16 is configured to be press-fit into adjacent end portions of the landscape edging units 12, 14 to establish an end-to-end connection between the two landscape edging units. Further, the landscape edging units 12,14 are configured to be installed on ground by driving the first landscape spike 18 and the second landscape spike 20 through the first and second landscape edging units and further through the landscape edging end connector 16 to the ground. Driving the landscape spikes into the ground also reinforces the end-to-end connection of the first and second landscape edging units 12, 14.

Referring now to FIGS. 2-5, an exemplary embodiment of a landscape edging unit 12 is shown. In the illustrated embodiment, the landscape edging units 12, 14 are essentially identical, but landscape edging units of differing appearance could also be connected end-to-end using the principles of the present disclosure. The landscape edging unit 12 comprises a first (e.g., right) edging unit end portion and a second (e.g., left) edging unit end portion spaced apart along a length L1 (FIG. 3) of the landscape edging unit. The landscape edging unit 12 comprises top and bottom portions spaced apart along a height H1 (FIG. 4) of the landscape edging unit, and front and back portions (broadly, first and second side portions) spaced apart along a front-to-back span or width W1 (FIG. 3) of the landscape edging unit. In one or more embodiments, the length L1 of the landscape edging unit is in an inclusive range of from 2 feet to 8 feet (e.g., 3 feet to 5 feet). In certain embodiments, the height H1 of the landscape edging unit is in an inclusive range of from 3 inches to 12 inches (e.g., 3 inches to 8 inches). The width W1 of the landscape edging unit can be in an inclusive range of from 2 inches to 10 inches (e.g., 2 inches to 6 inches).

In one suitable embodiment, the landscape edging unit 12 is manufactured by molding a robust, flexible material such as recycled tire rubber. However, alternative methods of manufacture may be used to form the landscape edging unit without departing from the scope of the disclosure. In an exemplary embodiment, the landscape edging unit is formed of resiliently compressible and flexible material. Recycled tire rubber is an example of one such material. Suitably, flexible landscape edging units 12 can be flexed into curved shapes and installed as edging along non-straight landscape borders. As explained in further detail below, the compressible nature of the landscape edging unit enhances press-fit of the more rigid end connector 16 into the landscape edging unit.

Figure 6:
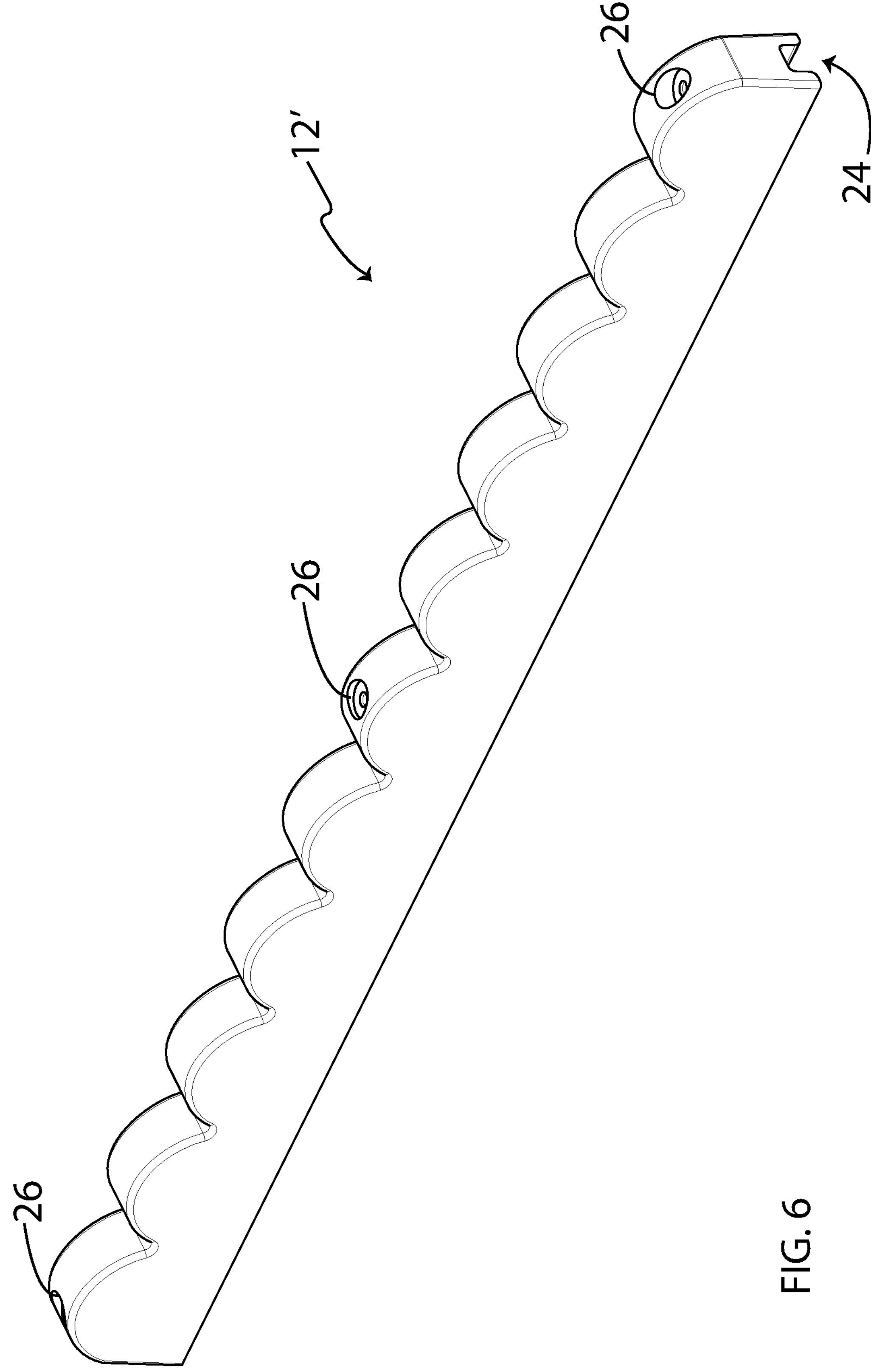
FIG. 6 is a perspective of a scalloped landscape edging unit.

The top, first side portion, and second side portion are desirably formed to have an aesthetically pleasing surface shape, e.g., a surface shape that resembles conventional hardscape edging materials such as cobblestone or scalloped concrete edging (see edging unit 12' shown in FIG. 6). Additionally, the top portion of each landscape edging unit 12 is formed to include a plurality of spike receivers 26 at spaced apart locations along the length L1 of the landscape edging unit. In the illustrated embodiment, there are three spike receivers 26 at spaced apart locations along the length L1 of the landscape edging unit 12. A right spike receiver 26 is located at the right end portion of the landscape edging unit 12, a left spike receiver 26 is located at the left end portion of the landscape edging unit, and at least one middle spike receiver 26 is spaced apart between the left and right spike receivers. As will be explained in further detail below, the left and right spike receivers 26 are configured to align with end connectors 16 to facilitate making end-to-end connections on either end of the landscape edging unit 14. As such (and as will be described in greater detail below), the shape of the bottom portion of the landscape edging unit below the left and right spike receivers 26 differs from the shape of the bottom portion of the landscape edging unit below the middle spike receiver. Each spike receiver 26 is configured to receive a respective landscape spike so as to position and guide the landscape spike as it is driven through the landscape edging unit 12 into the ground. In the illustrated embodiment, each spike receiver 26 comprises a countersunk hole with a smaller diameter bottom portion for receiving the shank of the landscape spike and a larger diameter top portion for receiving the head of the landscape spike. Each spike receiver 26 can be prefabricated (e.g., molded) as a through hole or a blind hole. In the latter case, the user would need to drive a landscape spike through a prefabricated web of material in order to stake landscape edging unit to the ground.

Figure 3:
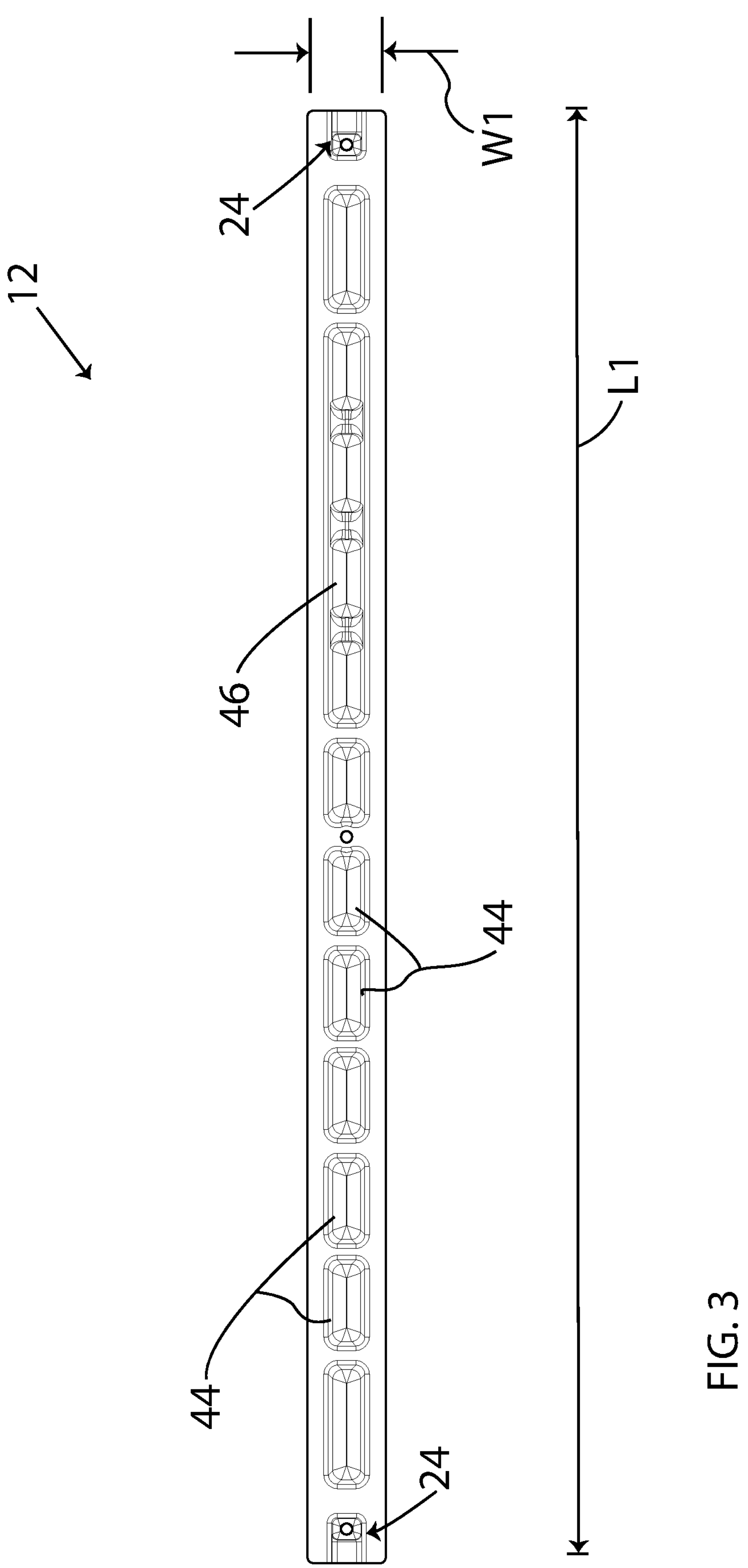
FIG. 3 is a bottom plan view of the landscape edging unit.

The bottom portion of the landscape edging unit 12 defines a flat bottom surface for resting flat on ground. As shown in FIG. 3, the bottom portion comprises one or more material reduction recesses 44 spaced apart along the length L1 of the landscape edging unit 12 to reduce a weight of the landscape edging unit. The bottom portion may also comprise a packaging recess 46 shaped and arranged to securely hold landscape spikes 18, 20 and end connector 16. The packaging recess 46 is similar to the material reduction recesses, except it has a greater length to accommodate the entirety of the landscape spikes 18, 20. In an exemplary embodiment, each landscape unit is packaged for sale with a plurality of landscape spikes (e.g., one spike for each spike receiver 26) and one end connector 16. The spikes 18, 20 and end connector 16 are placed into the packaging recess 46 and contained with plastic wrap or other packaging material.

Figure 4:
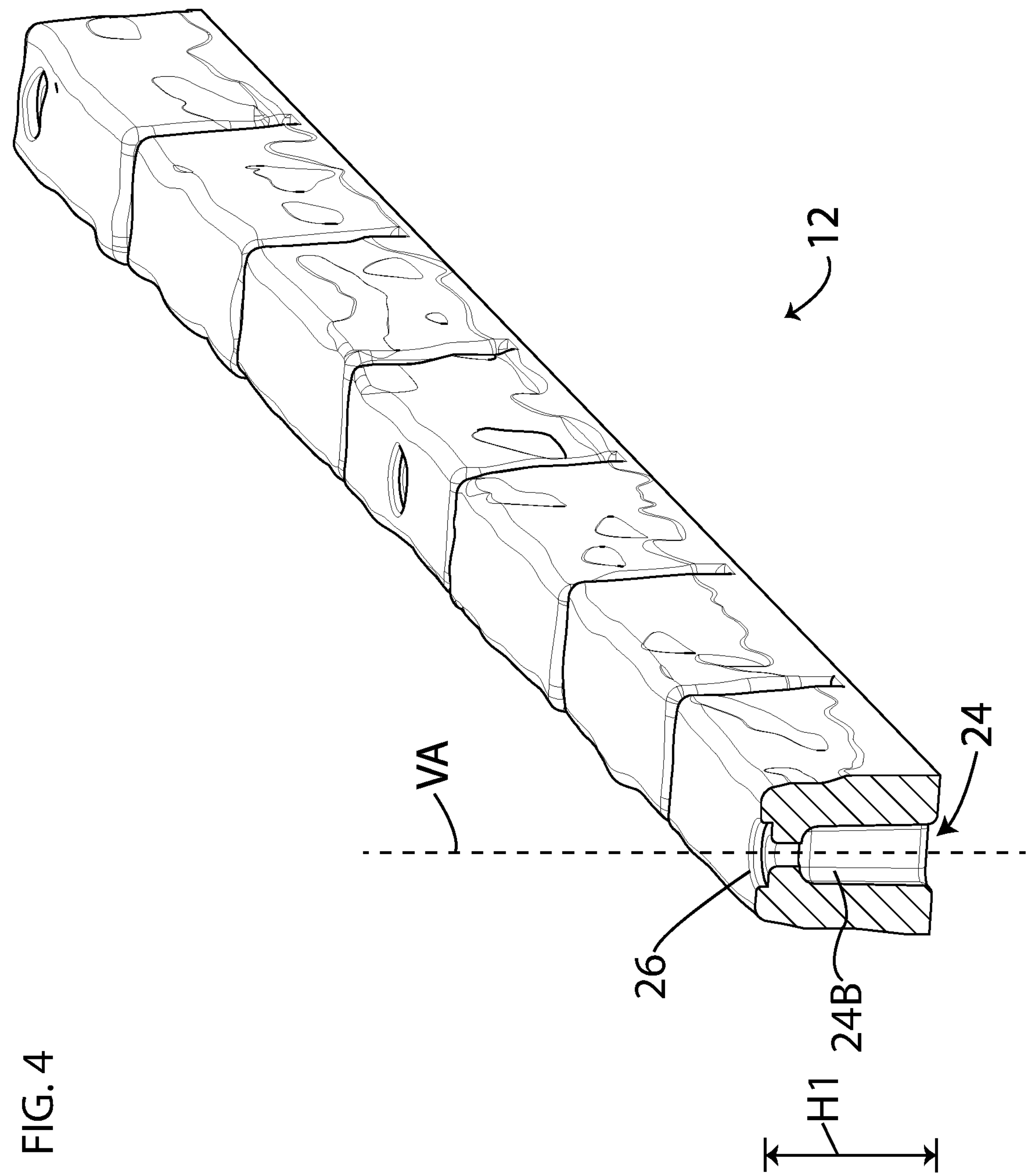
FIG. 4 is a cross-sectional perspective of the landscape edging unit.
Figure 5:
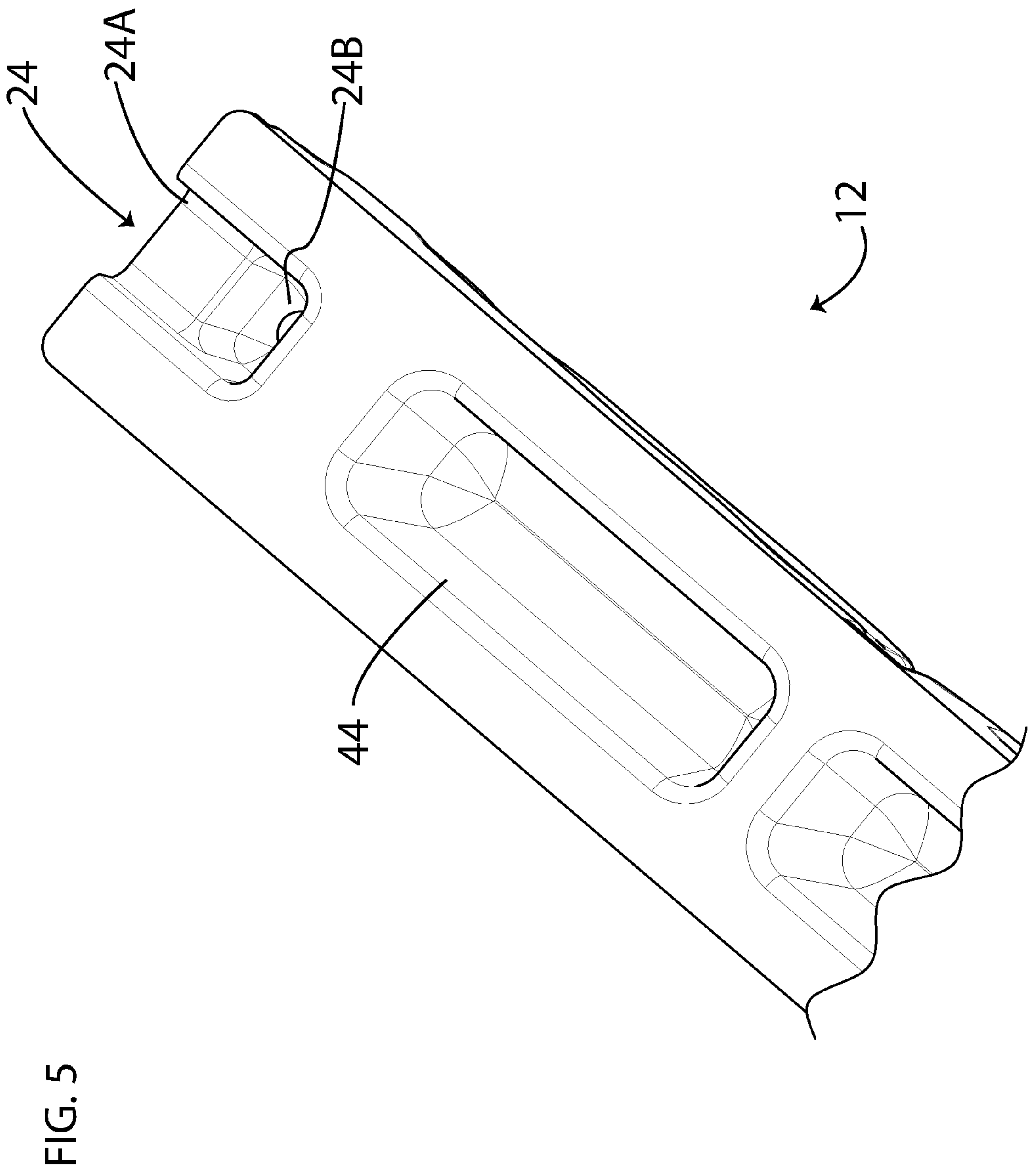
FIG. 5 is an enlarged fragmentary perspective of a bottom of the landscape edging unit.

Referring now to FIGS. 4-5, each end portion of the landscape edging unit 12 defines a fitting recess 24 below the corresponding spike receiver 26. Since the spike receiver 26 is located above the fitting recess 24, the spike receiver may be called an "upper spike receiver." As will be explained in further detail below, the fitting recess 24 is configured to align the end connector 16 with the upper spike receiver 26 so that a landscape spike in the upper spike receiver passes through the fitting recess 24 into ground. The fitting recess 24 comprises a lower portion 24A opening lengthwise through the edging unit end portion and a mortise portion 24B extending upward from the lower portion along a vertical axis VA. The edging unit end portion comprises material that extends 360 degrees about the mortise portion 24B with respect to the vertical axis VA. As shown in FIG. 5, the fitting recess 24 is a different size and shape than each material reduction recess 44, as the fitting recess is configured to receive the end connector 16 at the bottom portion of the landscape edging unit as described in further detail below. Note that FIG. 6 shows how the fitting recess 24 and aligned spike receivers of the present disclosure can be employed on edging units of varying shapes and sizes.

Figure 7:
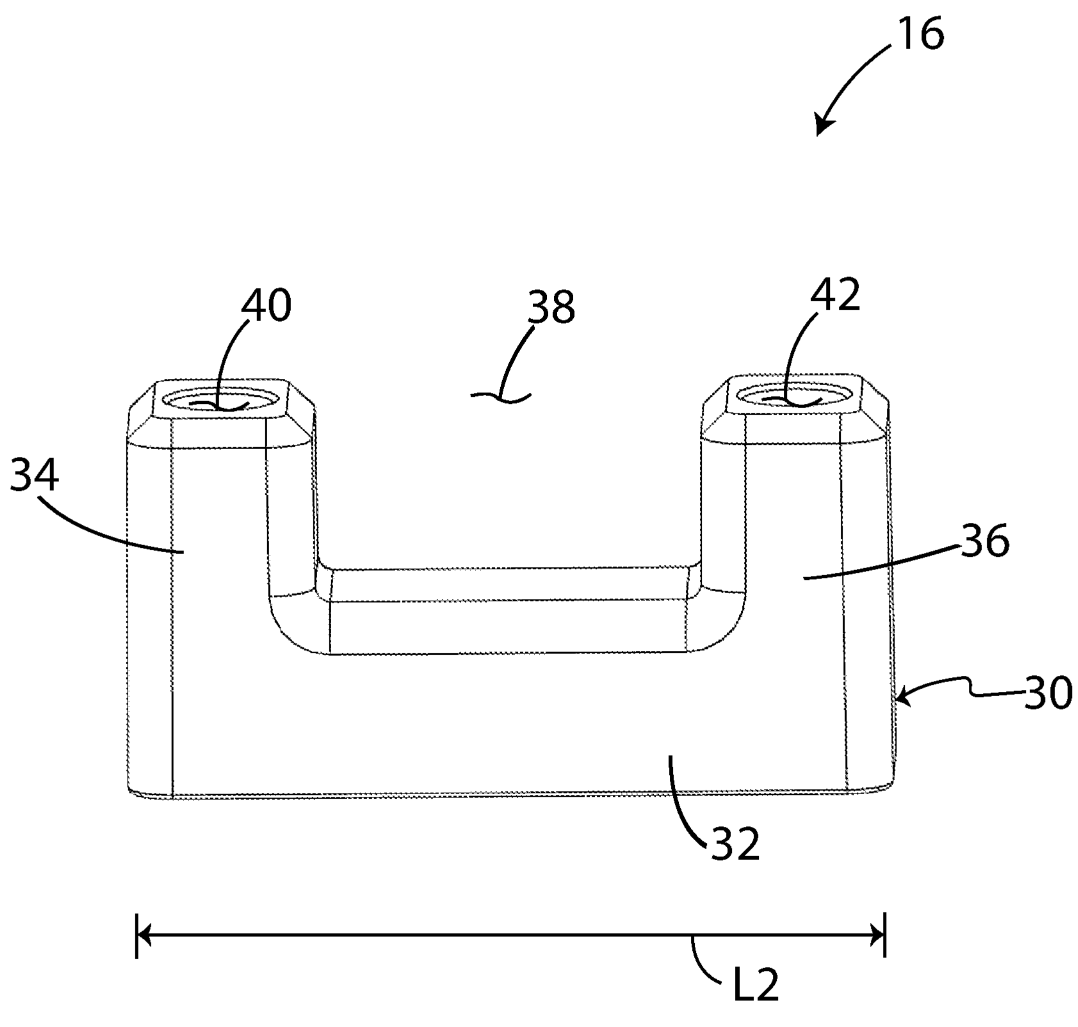
FIG. 7 is a perspective of a landscape edging end connector of the landscape edging system of FIG. 1.

Referring now to FIG. 7, an exemplary embodiment of the landscape edging end connector is generally indicated at reference number 16. The end connector 16 comprises a fitting body 30 having a base 32 having a length L2 extending from a first fitting end portion to a second fitting end portion. The fitting body 30 is configured such that the first and second fitting end portions are spaced apart along a lengthwise direction of the landscape edging when installed. The fitting body 30 further comprises a first leg 34 standing upright from the base 32 at the first fitting end portion and a second leg 36 standing upright from the base at the second fitting end portion. The first and second legs 34, 36 are spaced apart by a central gap 38 of the fitting body. The first leg 34 defines a first top of the fitting body and the second leg 36 defines a second top of the fitting body. The base 32 defines a bottom of the fitting body.

Each of the first and second legs 34, 36 forms a tenon (and thus, may be called a “tenon” or a “tenon leg”) for reception in the respective mortise portion 24B of a fitting recess 24 as a tenon into a mortise. The left leg 34 is configured to be press-fit into the fitting recess 24 of the right end portion of a landscape edging unit 12, 14, and conversely, the right tenon leg 36 is configured to be press-fit into the fitting recess 24 of the left end portion of a landscape edging unit. Press fitting either leg 34, 36 into the respective fitting recess 24 creates a fitting-body-to-edging-unit connection that joins the end connector 16 to the respective landscape edging unit 12 so that the end connector is constrained from moving lengthwise in relation to the landscape edging unit. This fitting-body-to-edging-unit connection is a mortise-and-tenon connection independent of the landscape spikes 18, 20. Preferably, each leg 34, 36 is configured to resiliently compress the edging unit material around the mortise portion 24B so that a snug friction-fit is established. When installed, each leg 34 is completely circumscribed (360 degrees about the vertical axis VA) by material of the first landscape edging unit 12. Moreover, material on one side of the mortise portion 24B is received in the central gap 38.

Each fitting end portion defines a respective spike receiver 40, 42. In the illustrated embodiment, the first spike receiver 40 is a hole that extends from the first top through the bottom of the fitting body 30, and the second spike receiver 42 is a hole that extends from the second top through the bottom of the fitting body. When the fitting body 30 is press fit into the fitting recesses 24 of first and second end landscape edging units 12, 14, each spike receiver 40, 42 in the fitting body is positioned below the upper spike receiver 26 above the respective recess 24. Hence, each spike receiver 40, 42 of the end connector 16 is configured to form a lower spike receiver of the landscape edging system 10. In use, each lower spike receiver 40, 42 is configured to receive the landscape spike 18, 20 that is driven through the respective upper spike receiver 26 into the ground. Accordingly, the landscape spikes 18, 20 establish a secondary connection between each landscape edging unit 12, 14 and the fitting 16, and moreover, stake the landscape edging system 10 to the ground at the location of the end-to-end connection between the two landscape edging units 12, 14.

As mentioned above, the landscape edging system 10 may be provided as a kit including at least one landscape edging unit, one landscape edging end connector-per-landscape edging unit, and one landscape spike-per-spike receiver 26. For packaging the kit, the landscape spikes 18, 20 and end connector 16 are removably secured within the packaging recess 46 of the landscape edging unit. This kitting configuration ensures that the components are kept together and are readily available for installation.

The landscape edging system 10, as discussed above, is configured to be installed on ground as landscape edging. A method of connecting landscape edging units 12,14 end-to-end and installing the landscape edging on ground is further described below.

Figure 8:
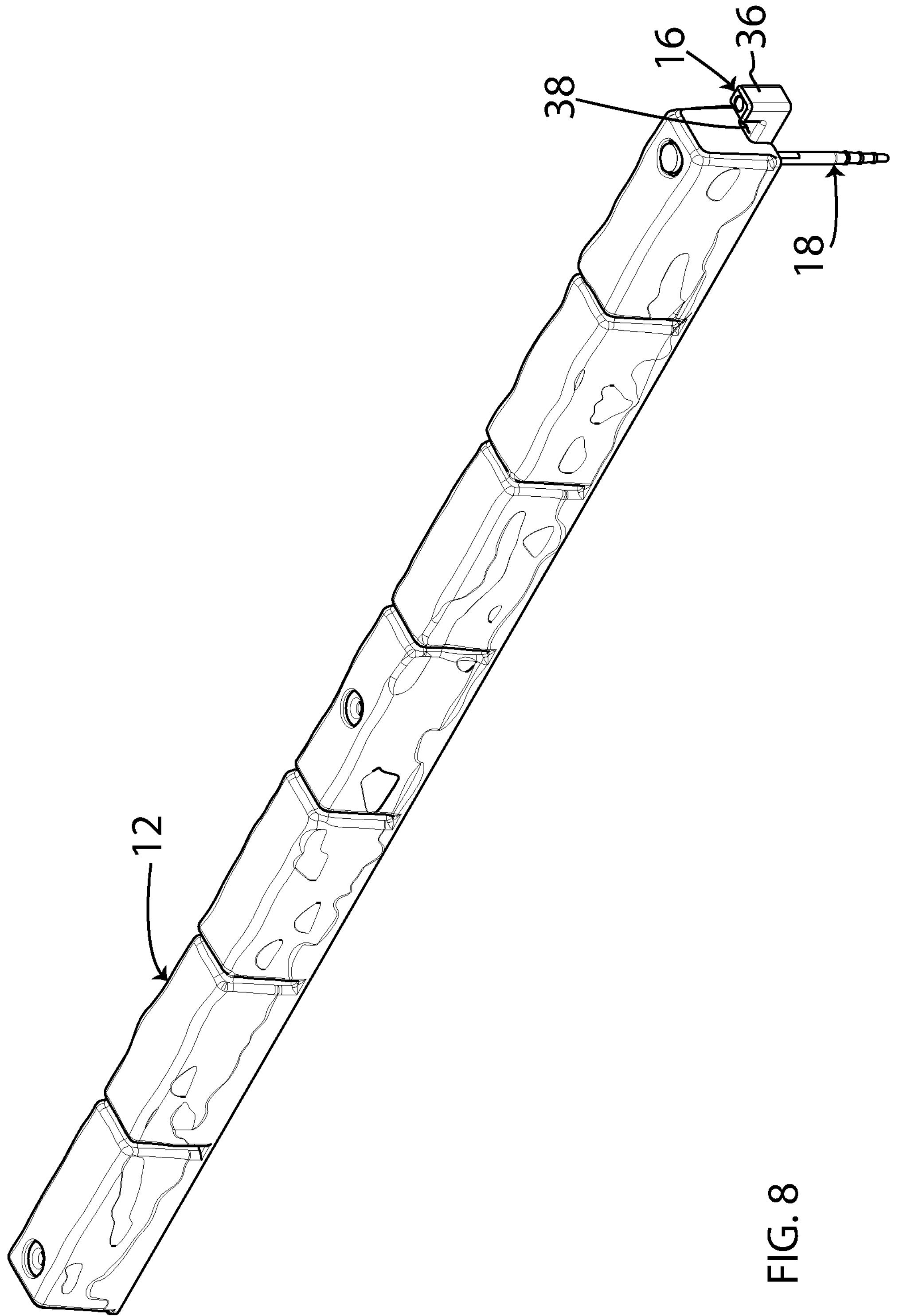
FIG. 8 is a perspective of the landscape edging system illustrating a landscape spike and the landscape edging end connector installed in a first landscape edging unit.

Referring to FIG. 8, the end connector 16 is installed in the first landscape edging unit 12. In the illustrated example, the end connector 16 is installed in the right end portion of the landscape edging unit 12. However, the end connector could be installed in either end of a first landscape edging unit depending on the landscape layout.

As shown, the left fitting end portion is press-fit into the right fitting recess 24 of the first landscape edging unit 12. This aligns the left lower spike receiver 40 with the right upper spike receiver 26 of the first landscape edging unit 12 and receives the left leg 34 into the mortise portion 24B of the right fitting recess 24 as a tenon into a mortise. The leg 34 being received in the mortise portion 24B creates a first fitting-body-to-edging-unit connection that joins the end connector 16 to the first landscape edging unit 12 so that the end connector is constrained from moving lengthwise in relation to the first landscape edging unit. Note that this fitting-body-to-edging-unit connection is established by mortise-and-tenon joint, independent of any landscape spike being driven through the landscape edging system 10. Preferably, the first leg 34 slightly compresses the material around the mortise portion 24B so that a snug friction-fit is established. When installed, the first leg 34 is completely circumscribed (360 degrees about the vertical axis VA) by material of the first landscape edging unit 12. Hence, a portion of the first landscape edging unit 12 is received in the central gap 38 with the first fitting end portion fit into the fitting recess 24 of the first landscape edging unit 12, and the second fitting end portion and leg 36 protrudes lengthwise from the edging unit end portion for reception in a second landscape edging unit 14.

At this stage, the first landscape edging unit 12 and the end connector 16 may be placed at the desired location on ground. Either at this point in the process or a later point, the first landscape spike 18 is driven through the upper spike receiver 26 of the first landscape edging unit 12, into the lower spike receiver 40, and further into the ground to install the first landscape edging unit and fitting on ground and creating a first fitting-body-to-ground connection. Because the landscape spike 18 passes through both the landscape edging unit 12 and the fitting body 30, the landscape spike 18 secures both components to the ground. In addition, the landscape spike 18 reinforces fitting-body-to-edging-unit connection previously established by mortise-and-tenon joint.

Figure 9:
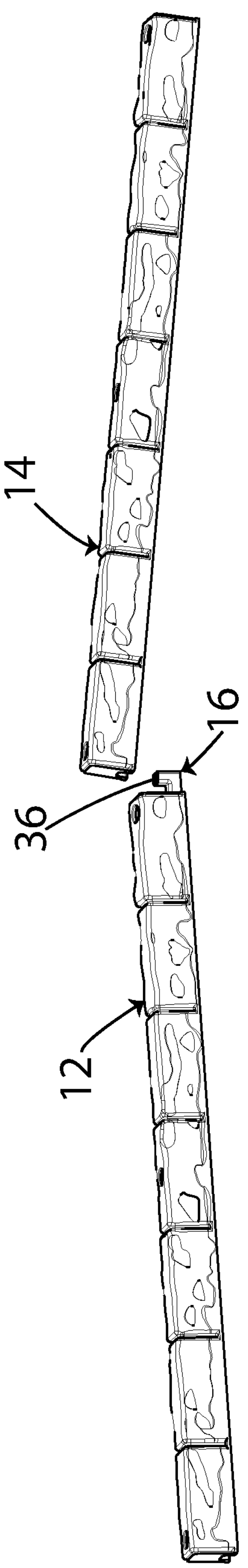
FIG. 9 is another perspective of the landscape edging system illustrating the landscape edging end connector installed in the first landscape edging unit and a second landscape edging unit approaching the landscape edging end connector for connection to the first landscape edging unit.
Figure 10:
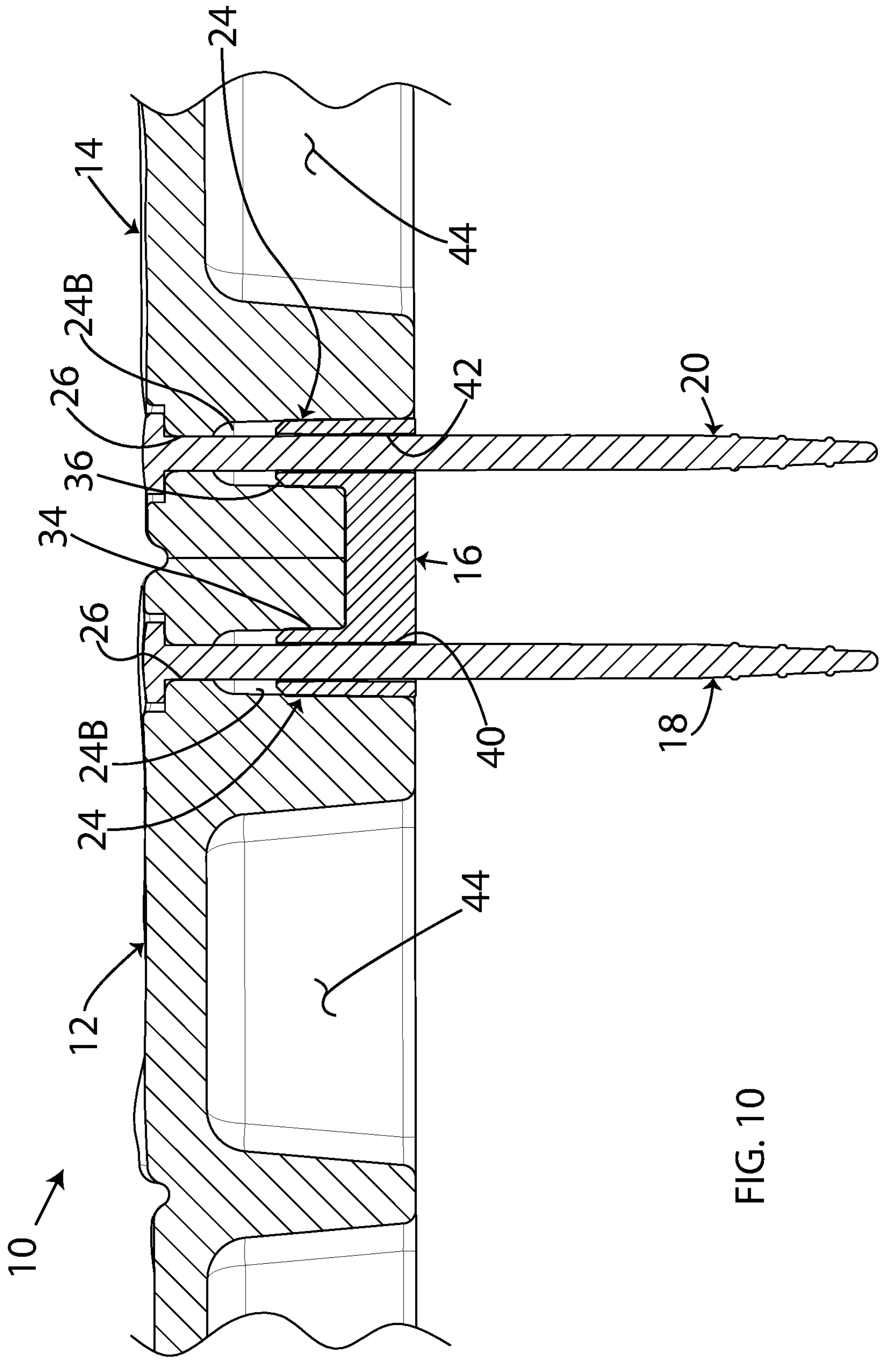
FIG. 10 is a fragmentary cross-section of the landscape edging system in an installed configuration.

Referring now to FIGS. 9-10, after installing the left end portion (first end portion) of the end connector 16 into the first landscape edging unit 12, the user installs the right end (second end portion) of the end connector into the second landscape edging unit 14. More particularly, the right fitting end portion is press-fit into the left fitting recess 24 of the second landscape edging unit 14 such that the lower spike receiver 42 aligns with the left upper spike receiver 26 of the second landscape edging unit. This causes the second leg 36 to be received in the mortise portion 24B of the fitting recess 24 of the second landscape edging unit 14 as a tenon into a mortise, which creates a second fitting-body-to-edging-unit connection that joins the end connector 16, previously joined to the first landscape edging unit 12, to the second landscape edging unit 14. The second fitting-body-to-edging-unit connection constrains the end connector 16 from moving lengthwise in relation to the second landscape edging unit. Similar to the first leg 34, the second leg 36 compresses the material around the mortise portion 24B so that a snug friction-fit between the second landscape edging unit 14 and end connector 16 is established. Additionally, when installed the second leg 36 is completely circumscribed by material of the second landscape edging unit 14 so that a portion of the second landscape edging unit 14 is received in the central gap 38. Accordingly, after the fitting body 30 is press fit into the fitting recesses 24 of first and second landscape edging units 12, 14, portions of each of the first and second landscape edging units 12, 14 are received in the central gap 38 of the fitting body. The adjacent end portions of the landscape edging units 12, 14 have planar faces that meet in face-to-face contact. A portion of the face-tot-face contact interface is located within the gap 38.

After the fitting body 30 is press-fit into the fitting recess 24 of the second landscape edging unit, the second landscape spike 20 is driven through the upper spike receiver 26 of the second landscape edging unit 14, into the second lower spike receiver 42, and further into the ground to create a second fitting-body-to-ground connection. Because the landscape spike 20 passes through both the landscape edging unit 14 and the fitting body 30, the landscape spike 20 secures both components to the ground. As shown in FIG. 10, once both spikes 18, 20 have been driven through the respective upper spike receivers 26 and lower spike receivers 40, 42, into the ground, the end connector 16 is secured to ground by two spikes. In addition, the adjacent end portions of the landscape edging units 12, 14 are each held in place by (i) a mortise-and-tenon connection to the end connector 16 and (ii) the respective spike 18, 20 driven into the ground.

Accordingly, it can be seen that the landscape edging system 10 provides a system for connecting edging units end-to-end to form long lengths of landscape edging in desired shapes. It will be apparent to a person skilled in the art that the landscape edging system 10 may be used to connect any number of landscape edging units end-to-end by repeating the above described process for the desired number of landscape edging units.

Advantageously, the landscape edging system 10 is configured to be easily uninstalled to relocate the landscape edging. Un-installing the landscape edging system requires minimal steps. In this instance, each landscape spike 18, 20 is pulled out from the ground G, edging end connector 16, and respective landscape edging unit 12, 14. From here, the connected landscape edging units and end connector may be relocated, or in an additional step each landscape edging unit is pulled apart from the edging end connector to completely disassemble the landscape edging system 10. The edging end connector 16 and landscape spikes 18, 20 may be stored within the packaging recess 46.

The landscape edging system 10 achieves both functional and aesthetic benefits. One benefit achieved by the present disclosure, is that material used to form the landscape edging units may be lightweight and flexible for ease of installation. With that, a secure connection is still maintained among the landscape edging units by installing the end connector to the landscape edging units, and further a secure connection is maintained to the ground by installing the landscape spikes to the landscape edging units and end connector. Moreover, the landscape edging system 10 enables the landscape edging units to be securely installed in various landscaping shapes to achieve various landscaping aesthetics and to define borders between different areas of landscaping. The present disclosure provides a landscape edging system with several advantages such as being lightweight, durable, cost-effective, easy to install, aesthetically pleasing and many others.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The invention claimed is:

1. A landscape edging system for removably installing a landscape edging unit on ground as landscape edging, wherein the landscape edging system comprises:

a first landscape edging unit comprising an edging unit end portion defining a fitting recess and an upper spike receiver aligned with the fitting recess;

a landscape edging end connector comprising a fitting body having a first fitting end portion and a second fitting end portion configured to be spaced apart along a lengthwise direction of the landscape edging, the first fitting end portion defining a first lower spike receiver and the second fitting end portion defining a second lower spike receiver, the first fitting end portion is configured to be fitted into the fitting recess of the edging unit end portion of the first landscape edging unit such that the first lower spike receiver aligns with the upper spike receiver of the first landscape edging unit;

a first landscape spike configured to be driven through the upper spike receiver of the first landscape edging unit and through the first lower spike receiver of the landscape edging end connector into the ground;

wherein the fitting recess comprises a lower portion opening lengthwise through the edging unit end portion and a mortise portion extending upward from the lower portion along a vertical axis, wherein the edging unit end portion extends circumferentially around the mortise portion.

2. The landscape edging system of claim 1, wherein the first landscape edging unit comprises one or more material reduction recesses configured to reduce an amount of material within the first landscape edging unit.

3. The landscape edging system of claim 2, wherein the fitting recess is a different size and shape than each of the one or more material reduction recesses.

4. The landscape edging system of claim 3, wherein the first landscape edging unit is formed of compressible and flexible material.

5. The landscape edging system of claim 3, wherein the first landscape edging unit is formed from recycled tire rubber.

6. The landscape edging system of claim 3, wherein the edging unit end portion extends 360 degrees about the mortise portion with respect to the vertical axis.

7. The landscape edging system of claim 6, wherein the first fitting end portion comprises a tenon leg configured to be friction-fit into the mortise portion as a tenon into a mortise.

8. The landscape edging system of claim 1, wherein when the first fitting end portion is fitted into the fitting recess, the second fitting end portion protrudes lengthwise from the edging unit end portion for reception in another fitting recess of another landscape edging unit.

9. The landscape edging system of claim 1, wherein the first fitting end portion comprises a tenon portion configured to be fitted into the mortise portion to make a mortise and tenon connection, the mortise and tenon connection configured to constrain the fitting body from moving lengthwise of the landscape edging in relation to the first landscape edging unit independent of the first landscape spike.

10. The landscape edging system of claim 1, wherein the fitting body comprises a base extending from the first fitting end portion to the second fitting end portion, a first leg standing upright from the base at the first fitting end portion and a second leg standing upright from the base at the second fitting end portion.

11. The landscape edging system of claim 10, wherein each of the first and second legs comprises a tenon leg configured to be received in the respective fitting recess as a tenon into a mortise whereby each of the first and second legs couples to the first and second landscape edging units by friction-fit.

12. The landscape edging system of claim 10, wherein the first and second legs are spaced apart lengthwise such that the fitting body defines a central gap between the first and second legs.

13. The landscape edging system of claim 12, wherein the fitting body is configured to receive portions of each of the first landscape edging unit and another landscape edging unit in the central gap.

14. The landscape edging system of claim 10, wherein the base defines a bottom of the fitting body, the first leg defines a first top and the second leg defines a second top, the first lower spike receiver comprising a hole extending from the first top through the bottom and the second lower spike receiver comprising a hole extending from the second top through the bottom.

15. The landscape edging system of claim 1, wherein the fitting body is more rigid than the first and second landscape edging units.

* * * * *